3,023,179
SOLID RUBBERY SUBSTANCES HAVING
IMPROVED TACK
Conrad J. Jankowski, Metuchen, and Wilbur F. Fischer, Cranford, N.J., assignors to Esso Research and Engineering Company, a corporation of Delaware
No Drawing. Filed Dec. 1, 1958, Ser. No. 777,213
10 Claims. (Cl. 260—25)

The present invention concerns solid polymers having improved tack or adhesive properties. More specifically, it relates to a method of improving the adhesive property of uncured isoolefin-containing polymers by mixing them with both resin and modified rosin.

Heretofore, uncured solid rubbery polymers have been made more adhesive by compounding them with various organic compounds and resins. A particularly useful resin in this regard is a nonreactive para-hydrocarbon substituted phenol formaldehyde resin. While this resin, as well as other substances, generally improve the tack or adhesive properties of the polymers with which they are compounds it has been found to be inadequate in the amount of tackiness which it imparts to low unsaturation polymers, such as butyl rubber.

Tack is an important property in the tire building field for here it is necessary to put the various parts of the tire together in a matter of minutes, e.g. 2 to 5 minutes, in order for the operation to be economically feasible. Since tires generally comprise from 2 to 10 plies, it is obvious that the surfaces of the plies must readily adhere to each other in order to permit rapid building and yet produce a tire which will not be faulty. Since butyl rubber and modified butyl rubbers have very low quick tack, they present tire builders with an acute problem which is not easily overcome with conventional tackifiers.

It has now been discovered that the adhesive properties of isoolefin-containing polymers, especially low unsaturation solid rubbery polymers, can be significantly increased by admixing the polymer with minor proportions of a non-reactive para-hydrocarbon substituted phenol formaldehyde resin and the ester of a modified rosin. The use of this unique combination of tackifiers reduces tire building time as much as 200%.

The present invention has particular application to low tack isoolefin-containing polymers, such as polyisobutylene, butyl rubber and halogenated butyl rubber. The polymers in which the tackifier system of the present invention may be used can be generically classified as solid isoolefin-containing rubbery polymers, e.g. hydrocarbon polymers, having viscosity average molecular weights of from about 50,000 to 2,000,000 or more.

Butyl rubber, a term well known in the rubber art, e.g. chapter 24 in "Synthetic Rubber" edited by G. Whitby, is a rubbery copolymer comprising a major proportion of an isoolefin having 4 to 7 carbon atoms and a minor proportion of a multiolefin having 4 to 8 carbon atoms. The most commonly employed isoolefin is isobutylene, although other isoolefins such as 3-methylbutene-1 and 4-methyl-pentene-1 may be used. Suitable multiolefins, which are generally conjugated diolefins, include isoprene, butadiene-1,3, dimethyl butadiene-1,3, piperylene and the like. Most of the copolymers contain about 85 to 99.5 wt. percent isoolefin and 0.5 to 15 wt. percent diolefin, which in most instances is isoprene. The polymerization is generally carried out at a low temperature, e.g. between −50 and −165° C., in the presence of a Friedel-Crafts catalyst, such as aluminum trichloride, dissolved in a lower alkyl halide, such as methyl chloride, ethyl chloride, etc. Their preparation is fully described in U.S. Patent 2,356,128. Butyl rubbers have viscosity average molecular weights between about 200,000 and 1,500,000 or more and Wijs iodine numbers between about 1 and 50.

The physical and chemical properties of butyl rubber may be modified by introducing a small quantity of halogen into the polymer. In producing halogenated butyl rubber, unmodified, unvulcanized butyl rubber is carefully halogenated until it contains about at least 0.5 weight percent (preferably at least about 1.0 weight percent) of combined halogen, but not more than about "X" weight percent of combined chlorine or 3.0 "X" weight percent of combined bromine wherein:

$$X = \frac{M_3 L}{(100-L)M_1 + L(M_2+M_3)} \times 100$$

and $L$ = mole percent of the multiolefin in the polymer
$M_1$ = molecular weight of the isoolefin
$M_2$ = molecular weight of the multiolefin
$M_3$ = atomic weight of the halogen Restated, there should be at least about 0.5 wt. percent of combined halogen in the polymer but not more than about one atom of chlorine or 3 atoms of bromine combined in the polymer per molecule of multiolefin present therein; i.e. per double bond in the polymer.

Suitable halogenating agents which may be employed are gaseous chlorine, liquid bromine, alkali metal hypochlorites, or hypobromites, sulfur chlorides or bromides (particularly oxygenated sulfur chlorides or bromides), pyridinium chloride perchloride, N-bromo-succinimide, iodine monochloride, alpha-chloroacetoacetanilide, tribromophenol bromide, N-chloroacetamide, beta-bromomethyl phthalimide, N,N'-dimethyl-5,5 dichloro or dibromo hydantoin, and other common halogenating agents.

The halogenation is generally conducted at above 0° to about +100° C., advantageously at about 0° to 65° C., preferably at about 20° to 50° C. (room temperature being satisfactory), depending upon the particular halogenation agent, for about one minute to several hours. An advantageous pressure range is from about 0.5 to 400 p.s.i.a.; atmospheric pressure being satisfactory. The halogenation conditions are regulated to halogenate the rubbery copolymer to the extent above mentioned.

In carrying out one embodiment of the present invention, about 1 to 90 or 100 parts by weight of a combination consisting of modified wood rosin and non-reactive resin is compounded with 100 parts by weight of polymer in a conventional manner, such as on a mill, in a Banbury mixer or in solution. The tackifiers may be added either as a mixture or separately. Where the polymer and tackifiers are mixed in solution, it may be necessary to remove the solvent by exposing the mixture to an elevated temperature either at atmospheric pressure or reduced pressure. Where the polymer is to be compounded with other ingredients, such as processing oil, fillers, etc., it is advisable to add the mixture of tackifiers after all of the other ingredients, except of course curing agents and accelerators, have been compounded with the polymer. Moreover, where the polymer is to be vulcanized after it is compounded with the tackifiers of the present invention, it is advantageous to use no more than about 20 php. (php.=parts by wt. per 100 parts by wt. polymer) of the aforementioned tackifier mixture, and it is best for most purposes to use from about 5 to 12 php. of the tackifier mixture. Where the polymer is used principally as an adhesive, such as in a mastic tape, the amount of tackifier mixture employed may be as little as 5 php. or as much as 60 php. In any event, it has been found that this combination of tackifiers will surprisingly increase the tack of a polymer by as much as five to twenty-fivefold or more.

The non-reactive para-hydrocarbon substituted phenol formaldehyde resin, which is one component of the tackifier system of the present invention, may be prepared by condensing a suitable para-hydrocarbon substituted phenol with formaldehyde in the presence of a catalyst, preferably one which is acid, e.g. sulfuric acid. The hydrocarbon group in the para position of the phenol is preferably an alkyl containing from 3 to 20 carbon atoms, the preferred alkyls being tertiary-butyl and octyl. However, other hydrocarbon groups such as cycloalkyl, aryl and aralkyl groups may be substituted in the para position. Some suitable substituted phenols which may be used in the preparation of these resins are as follows:

4-tertiary-butyl phenol
4-octyl phenol
4-dodecyl phenol
4-phenyl phenol
4-benzyl phenol
4-cyclohexyl phenol The resins prepared with these substituted phenols generally contain at least 2 but not more than 6 phenyl groups. Most of these resins have substantially no methylol groups and have 3 to 5 phenyl groups, depending on how the condensation is carried out. One of the best known resins of this type is Amberol ST–137X, a tradename of Rohm & Haas Company, which is believed to be prepared by condensing para-octyl phenol with formaldehyde in the presence of an acid catalyst. It has a specific gravity of 1.04, an acid number of less than 50 mg./gram and a melting point of 65 to 90° C.

The modified rosins coming within the purview of this invention are those prepared from diterpene acids, e.g. abietic, pimaric and sapinic. These acids, which are generally of the heterannular diene type, may be modified by reaction with an organic dibasic acid anhydride containing a total of 4 to 5 carbon atoms. Suitable unsaturated cyclic anhydrides of dibasic organic acids include maleic anhydride and citraconic anhydride. A second method of modification is to polymerize the diterpene acid to the dimer or trimer state. It is generally advisable not to carry it beyond the trimer state, and preferably to the dimer state. The polymerized or anhydride modified acid in any event is then esterified according to known techniques with a polyhydric alcohol containing 4 to 5 carbon atoms and an equal number of hydroxyl groups (tetra- to pentahydric alcohols). Satisfactory polyhydric alcohols include erythritol, arabitol and especially pentaerythritol which is the preferred alcohol.

The esters recovered should have a high softening point, that is at least 150° C. by the Hercules drop method and as high as 200° C. or higher. An outstanding ester of the present invention is prepared by dimerizing a diterpene acid, such as abietic acid and/or neoabietic acid, and esterifying the dimer with pentaerythritol. This ester has a softening point of about 185° or 190° to 200° C.

The amount of anhydride used to modify wood rosin will vary according to the particular anhydride employed. However, it is generally not advisable to use more than about 6 or 8 parts by weight of anhydride per 100 parts by weight of rosin. While even a small amount of anhydride will produce a beneficial effect, e.g. 0.5 part by weight, it may be necessary to use at least 1 or 2 parts by weight per 100 parts by weight of rosin, depending upon the specific anhydride employed, to obtain an acid that will form an ester having the desired tackifying properties when the anhydride modified rosin is reacted with polyhydric alcohols of the type already described. The anhydride-rosin reaction may be carried out at a temperature above 100° C. When rosin is heated, to say 110° C., small amounts of levopimaric acid are formed by intramolecular rearrangement of the conjugated double bonds. In this latter compound both double bonds are in a conjugated position in the same six-membered ring and can react with an anhydride, e.g. maleic anhydride. The resultant structure has five not three rings, and instead of having one acid group, it has three acid groups available for further reaction. The original conjugated unsaturation of the levopimaric acid isomer is suppressed.

While the ratio of non-reactive resin to modified rosin ester may be varied from 0.3:1 to 15:1, it has been found that the adhesive properties of the polymer are outstandingly improved when a major amount of resin is used, e.g. about 1.5 to 8 parts by weight of non-reactive resin for each part by weight of modified rosin ester. When the last-mentioned ratio of resin to ester is employed, the tack of the polymer is as much as five to twenty-fivefold, or more, greater than the tack obtained when either tackifier is used alone.

In addition to the resins and modified rosin esters described above, the polymer may be compounded with other ingredients commonly admixed with the particular polymer. For instance, in the case of a vulcanizable rubber such as butyl rubber, the following formula serves to illustrate the amount and kinds of materials that may be added to the rubber. However, it should be noted that any one or more of these ingredients may be omitted according to the wishes of the formulator.

| Ingredients: | Parts by weight |
| --- | --- |
| Rubber | 100 |
| Fillers | 25–75 |
| Stearic acid | 1–10 |
| Metal oxide | 0.5–20 |
| Pigment (TiO$_2$) | 1–20 |
| Extender oil | 1–30 |
| Processing oil | 1–50 |
| Plasticizers | 1–75 |
| Curing agents | 1–20 |
| Accelerators | 0.5–10 |
| Scorch retarders (Cu stearate) | 0.5–10 |
| Antioxidants | 0.1–5 |

Suitable curing agents include such things as sulfur, sulfur-containing compounds, para-dinitrosobenzene, para-quinone dioxime and polymethylol para-hydrocarbon substituted phenolic resins prepared in the presence of a basic catalyst. Other curing agents that are especially suitable for polymers containing halogen are zinc oxide, tetramethylthiuramdisulfide and zinc dimethyldithiocarbamate, the latter two being sulfur-containing compounds. Suitable accelerators include such things as benzothiazyl disulfide, tetramethylthiuramdisulfide and tellurium diethyldithiocarbamate. When it is desired to subject the polymer to heat treatment in the presence of a filler, particularly carbon black, it is desirable to have a small amount, e.g. 0.2 to 1 php., of a promoter such as sulfur, para-quinone dioxime, or N,4-dinitroso-N-alkyl aniline, present. The heat treatment may be carried out in conventional mixing equipment in a manner such that the rubber, filler and promoter attain a temperature of about 200 to 300° F. for several minutes, e.g. 1 to 10 minutes.

Among the carbon blacks that may be compounded with the polymer are the channel blacks such as EPC, MPC, HPC, and CC (these letters denoting carbon black products well known to the trade), the furnace blacks including SRF, HMF, CF, FF and HAF carbon blacks and the thermal blacks.

The mineral fillers which may be used include any of the non-carbon black fillers or pigments such as the oxides, hydroxides, carbonates and so forth of silicon, aluminum, magnesium, titanium, or the like, or silicates or aluminates of the various elements indicated. Examples of various mineral fillers (which are preferably hydrated mineral fillers) that may be used include the following:

Aluminum silicate
Hydrous aluminum silicate
Precipitated calcium carbonate
Basic aluminum sulfate
Aluminum hydroxide
Bauxite
Kaolin
Magnesium carbonate
Precipitated magnesium carbonate
Various clays (various $SiO_2/Al_2O_3$ ratios)
Precipitated hydrated calcium silicate and meta silicate
Hydrated silica
Silica gel
Alumina gel
Titanium dioxide These carbon blacks and/or mineral fillers should be finely divided powders, 99% passing a 320 mesh screen down to as fine as 0.01 to 0.02 microns average size. The proportion of filler to be used may vary according to the intended use of the final composition and according to the particular combination of physical properties desired, but should normally be within the range of about 10 to 200, preferably about 50 to 100 or 150 parts by weight of carbon black or mineral filler to 100 parts by weight of the polymer.

While the amount of processing oil may be varied from 1 up to say 50 php. in most polymers, it is preferred, especially in the case of butyl rubber, to use about 5 to 20 php. of a paraffinic or naphthenic inert hydrocarbon oil. A suitable naphthenic oil is Necton 60 which has an API gravity of about 25.5, an SSU viscosity at 210° F. of 58 seconds and a flash point of 445° F.

The polymer-tackifier mixture of the present invention may be used as an adhesive per se or alternatively it may be applied to a natural or synthetic supporting film comprising, among other things, cellophane, plastics, rubber, paper, or cotton fabric. The support, which may be a narrow strip or sheet of any suitable supporting material, may be coated on either or both sides with the polymer-tackifier mixture by any technique known in the adhesive art. For instance, the compounded polymer may be applied to the surface of the support in the form of a 2–30 wt. percent cement and the cement solvent, generally a $C_5$ to $C_8$ hydrocarbon, may be removed by passing the treated support through a zone having a sufficiently high temperature to cause the solvent to evaporate. A suitable recipe that may be applied to a tape is as follows:

| Ingredients: | Parts by weight |
|---|---|
| Polymer | 100 |
| Filler | 50–150 |
| Tackifier mixture | 5–15 |
| Process oil | 1–10 |

The polymer compositions of the present invention have many applications in tires; for instance, they may be employed in compounding the carcass plies, coating the fabric that wraps the bead, in the chafer that covers the bead, as an insulating composition for the bead itself, and as a tread cement.

Vulcanizable rubber containing the tackifier system of the present invention may be cured in the presence of a suitable vulcanizing agent and other compounding agents, at temperatures between about 250° and 400° F. When the tackifiers are added to the polymer composition late in the compounding process, that is after it has been compounded with fillers, heat treatment promoters and processing oils, it has been found that the vulcanizates have physical and dynamic properties equal to or better than similar recipes which do not contain the tackifiers.

The following examples are given to more clearly illustrate how the present invention may be carried out and to demonstrate some of the benefits that are derived from the invention.

Isobutylene-isoprene butyl rubber of about 40,000 Staudinger viscosity average molecular weight (ca. 375,000 viscosity average molecular weight) having a 2.2 mole percent unsaturation was compounded in accordance with the following recipe and its tack strength measured for both dwell and quick grab tack.

MASTER RECIPE

| Ingredients | Parts by weight |
|---|---|
| Butyl rubber | 100 |
| ISAF black | 40 |
| N,4-dinitroso-N-methyl aniline (promoter) | 0.75 |
| Zinc oxide | 5 |
| Bayol F* (processing oil) | 10 |
| Phenyl β naphthylamine | 1 |
| Non-reactive resin | As indicated |
| Modified ester | As indicated |
| Sulfur | 1.5 |
| Tellurium dimethyldithio-carbamate | 1.3 |
| Benzothiazyl disulfide | 1 |

* Bayol F is a paraffinic hydrocarbon oil having a specific gravity of 0.825, a flash point of 290° F. and a SSU viscosity at 100° F. of 50 seconds.

The test specimen was made by calendering the experimental compound on each side of a low gauge square-woven rayon fabric at 150–210° F. to an over-all gauge of 0.040±0.002". A die-cut sample (6 x 1") of the calendered fabric was placed in the jaws of an Instron tester set 4" apart. The jaws were then moved together to a separation of 0.015" so as to apply a constant, instantaneous compressive load to the calendered fabric. The force required to separate the plied samples was measured as the jaws moved apart. Quick grab tack was measured by rapid jaw separation (20" per minute) and dwell tack was measured by slow jaw separation (2" per minute). Both the quick and dwell tack measurements were made at room temperature (77° F.).

EXAMPLE 1

To portions of the master recipe given above were added 10 php. of Amberol ST–137X, 10 php. of Pentalyn K and a mixture consisting of 5 php. of each of the foregoing. The mixing cycle was as follows:

| Ingredients: | Time in minutes |
|---|---|
| Butyl rubber | 0 |
| Promoter, ⅓ black | ½ |
| ⅓ black | 2 |
| ⅓ black, Zinc oxide, ½ oil | 5 |
| ½ oil, Tackifiers | 7 |

The polymer mixture was dumped at the end of 10 minutes at 330° F. and the remaining ingredients, namely sulfur and accelerators, were added on a mill at 170–220° F. The tack strength of each of these compositions is given in Table I:

*Table I*

| Master recipe including— | Tack strength | |
|---|---|---|
| | Quick grab, lbs. of pull | Dwell, lbs. of pull |
| 10 php. Amberol ST–137X | 0.45 | 0.48 |
| 10 php. Pentalyn K | 0.45 | 0.28 |
| 5 php. Amberol ST–137X and 5 php. Pentalyn K | 2.7 | 2.7 |

Pentalyn K, a tradename of the Hercules Powder Company, is a pentaerythritol ester of dimerized wood rosin. It has a softening point (Hercules drop method) of 189 to 197° C., a maximum acid number of 25 mg./gram and a Gardner Holdt viscosity (50 wt. percent spirits solution) at 25° C. of T–X. The Hercules drop method consists of determining the temperature at which a given rate of resin begins to drop from the bulb of a thermometer in a test tube immersed in a constant temperature bath. The temperature of the bath should be between 9 and 14° C. above the softening point of the resin sample.

The data in Table I show that the tackifier mixtures of the present invention cause an outstanding increase in tack strength over that obtained with either tackifier alone. Moreover, when the compounded polymers of this example were cured for 40 minutes at 307° F., the vulcanizate obtained with the rubber compounded with the tackifier mixture was equivalent to that gotten with the rubber compounded with each of the tackifiers alone. This is shown by the physical and dynamic properties of the vulcanizates given in Table II:

*Table II*

| Physical properties | Amberol ST-137X | Pentalyn K | Mixture (Amberol ST-137X and Pentalyn K) |
|---|---|---|---|
| Tensile | 1,780 | 1,920 | 1,850 |
| Modulus at 300% | 1,290 | 1,280 | 1,200 |
| Elongation | 385 | 400 | 415 |
| Shore "A" | 52 | 57 | 56 |
| Goodrich flexometer (slugs cured 45' at 307° F.) (.25" stroke, 89 p.s.i. load, 30 cps., 30' time, 100° C.): | | | |
| Percent dynamic drift | 4.8 | 9.3 | 5.8 |
| Percent permanent set | 7.3 | 12.7 | 10.6 |
| T. ° F. | 28 | 36 | 32 |

The data in Table II show that the polymer composition of the present invention not only has physical properties equivalent to those possessed where each tackifier is used alone, but it has improved dynamic properties as well.

EXAMPLE 2

To demonstrate that the ratio of resin to modified ester is critical in order to obtain highly outstanding tackiness or adhesive qualities, varying amount of Amberol ST–137X and Pentalyn K were compounded with butyl rubber according to the master recipe given above.

*Table III*

EFFECT OF RATIO OF TACKIFIERS IN MIXTURE ON TACKINESS OF POLYMER

| | Tack strength | |
|---|---|---|
| | Quick grab, lbs. of pull | Dwell, lbs. of pull |
| 3 php. Amberol ST-137X and 7 php. Pentalyn K | 1.25 | 1.15 |
| 5 php. Amberol ST-137X and 5 php. Pentalyn K | 2.7 | 2.7 |
| 7 php. Amberol ST-137X and 3 php. Pentalyn K [1] | 3.9 | 3.1 |
| 8.5 php. Amberol ST-137X and 1.5 php. Pentalyn K | 5.0 | 3.8 |

[1] Recipe contained 8 php. of Bayol F oil instead of 10 php.

The data show that as the ratio of modified rosin ester to resin approaches 1:2 to 1:5, the tack strength is significantly increased. This is especially true with regard to the quick grab tack strength where there is a difference of as much as 4¾ lbs. of pull. Quick grab tack strength is an important property because the ply is pressed against the surface of another ply for only a fraction of a second and if it fails to adhere in that brief period, a faulty tire will result.

EXAMPLE 3

Isobutylene-isoprene butyl rubber identical with that used in the master batch recipe was compounded according to the following recipes:

| Ingredients | Recipe B, (parts by weight) | Recipe C, (parts by weight) |
|---|---|---|
| Butyl rubber | 100 | 100 |
| HAF carbon black | 35 | 35 |
| MT carbon black | 15 | 15 |
| N,4-dinitroso-N-methyl aniline | 0.8 | 0.8 |
| Zinc oxide | 5 | 5 |
| Bayol F | 7.5 | 7.5 |
| Amberol ST-137X | 7 | 7 |
| Pentalyn X | 3 | |
| Pentalyn K | | 3 |
| Sulfur | 2 | 2 |
| Tellurium diethyldithiocarbamate | 1.3 | 1.3 |
| Benzothiazyldisulfide | 1 | 1 |

Recipes B and C were then evaluated for quick grab tack strength according to the method already described (Table IV.)

*Table IV*

| Tack strength | Recipe B | Recipe C |
|---|---|---|
| Quick grab, lbs. of pull | 4.6 | 6.2 |

Pentalyn X, a tradename of the Hercules Powder Company, is believed to be a wood rosin modified with 6 to 8 parts by weight of maleic anhydride (per 100 parts by weight of rosin) at a temperature above 100° C. (about 110° C.) and thereafter completely esterified with pentaerythritol. It has a softening point by the Hercules drop method of 159° C. (147° C. by ASTM ring and ball method), an acid number of 16 mg./gram or less and a Gardner Holdt viscosity (50 wt. percent solution in mineral spirits) of O-V.

While the data in Table IV indicate that Pentalyn X is almost as effective as Pentalyn K when used in combination with the resins of the present invention, the tack strength which it produces in the polymer lasts a short time, e.g. in some instances only a few days, while the excellent tack strength imparted to the polymer by the dimerized rosin ester (Pentalyn K) lasts for several weeks to several months or more. Therefore, it is important to use the dimerized rosin ester in combination with the non-reactive para-hydrocarbon substituted phenol resin where lasting tack is necessary.

The polymer compounded according to recipes B and C above were cured for 40 minutes at 307° F. and the physical and dynamic properties of the vulcanizates were evaluated. These data are set forth in Table V:

*Table V*

| Physical properties | Recipe B | Recipe C |
|---|---|---|
| Tensile | 1,540 | 1,675 |
| Modulus at 300% | 1,240 | 1,380 |
| Elongation | 380 | 360 |
| Shore "A" | 58 | 55 |
| Goodrich flexometer (slugs cured 45' at 307° F.) (.25" stroke, 89 p.s.i. load, 30 cps., 30' time, 100° C.): | | |
| Percent dynamic drift | 6.4 | 4.8 |
| Percent permanent set | 9.5 | 8.0 |
| T. ° F. | 23 | 20 |

EXAMPLE 4

Chlorinated isobutylene-isoprene butyl rubber having a Wijs iodine number of 6.8 and a viscosity average molecular weight of about 400,000 and containing about 1.36 wt. percent combined chlorine, was compounded as follows and the compounded halogenated rubber was calendered on either a nylon cord fabric or Holland cloth:

| Ingredients | Recipe D, (parts by weight) | Recipe E, (parts by weight) |
|---|---|---|
| Chlorinated butyl rubber | 100 | 100 |
| EPC black | 45 | 45 |
| Necton 60 | 10 | 10 |
| Zinc oxide | 5 | 5 |
| 2-mercaptoimidazoline | 1.5 | 1.5 |
| Sulfur | 0.5 | 0.5 |
| Morpholine disulfide | 0.5 | 0.5 |
| Amberol ST-137X | 7.5 | 5.25 |
| Pentalyn K | | 2.25 |

The room temperature "relative tack" was measured by folding over a 6 x 1" piece of calendered nylon cord fabric on itself and passing a 10 lb. roller over the folded rubber coated fabric. The rubber layer on the nylon cord fabric was 20 mils thick. The pressed layers were then separated by hand at room temperature and the tack was reported as being from poor to good plus. The high temperature (200° F.) "relative tack" was determined by heating the compounded rubber to approximately 200° F. and calendering a 20 mil layer of the rubber on Holland cloth. The rubber layer was immediately folded and pressed against itself and then separated by hand while the rubber was still at a temperature of about 200° F. The results were reported in the same manner as that used for the room temperature "relative tack."

*Table VI*

RELATIVE TACK OF CHLORINATED BUTYL RUBBER

| Relative tack | Recipe D | Recipe E |
|---|---|---|
| Room temperature | Good | Good+ |
| 200° F | Poor | Fair+ |

The data in Table VI show that the combination of tackifiers of the present invention significantly increases the tack of halogenated butyl rubber at both room temperature and higher temperatures as determined by the above-described methods.

EXAMPLE 5

Isobutylene-isoprene butyl rubber having a Staudinger viscosity average molecular weight of about 40,000 and a mole percent unsaturation of 1.5 was compounded according to the following recipe:

Ingredients:  Recipe F (parts by weight)
    Rubber --------------------------------- 100
    FT carbon black ----------------------- 90
    Atomite (calcium carbonate) ---------- 20
    Necton 60 ------------------------------ 5
    Copper oxide --------------------------- 2
    Pentalyn K ----------------------------- 3
    Amberol ST-137X ----------------------- 7

The rubber was compounded in a Banbury mixer and dumped at a temperature of 300° F. The compounded rubber was calendered on a polyvinyl chloride film 0.01" thick to form a coating of approximately the same thickness. The roll temperatures of the calender were 200, 190 and 100° F. from top to bottom. Stock green strength and surface tack were such that excellent adhesion to the polyvinyl chloride backing was obtained in the calendering operation, while cold adhesion was low, thus providing proper dispensing from the roll. It was noted that adhesion at the calendered bond was maintained after one month of shelf aging. The adhesive strength at the calendered interface was determined by a friction peel test of 1 inch wide polyvinyl chloride-butyl rubber-polyvinyl chloride laminate. The laminate was formed by pressing the calendered surface of the 1 inch wide strip against itself and peeling one of the polyvinyl chloride layers from the adhesive by means of an Instron Tester at the rate of 20 inches per minute. The maximum stress attained in peeling was recorded as the adhesive strength of the specimen. The peel strengths of the calendered bond to the polyvinyl chloride backing are given in Table VII:

*Table VII*

ADHESIVE PEEL STRENGTH OF CALENDERED BOND TO VINYL BACKING

| Shelf aging | Adhesive peel strength lbs./inch |
|---|---|
| 24 hrs | 19.3 |
| 1 month | 21.0 |

The adhesive peel strength, after 24 hours aging, obtained with a similar recipe containing 10 php. of dimethyl hydantoin was 2.1 lbs. per inch. Thus, the combination of tackifiers of the present invention produce a mastic compound which has unusual adhesive strength. The copper oxide used in the above recipe serves as a fungicide.

Resort may be had to various modifications and variations of the present invention without departing from the spirit of the discovery or the scope of the appended claims.

What is claimed is:

1. Composition of matter having improved adhesive properties which comprises a major proportion of solid rubbery isobutylene-containing copolymer of a major portion of a $C_4$ to $C_7$ isoolefin and a minor portion of a $C_4$ to $C_8$ multiolefin and a minor proportion of a mixture comprising a major proportion of para-hydrocarbon substituted phenol-aldehyde resin containing 2 to 6 phenyl groups and a minor proportion of a polyhydric $C_4$ to $C_5$ alcohol ester of an acid selected from the group consisting of polymerized wood rosin and cyclic anhydride modified wood rosin, said ester having a softening point of at least 150° C. by the Hercules drop method.

2. Composition of matter having improved adhesive properties which comprises an admixture of (a) 100 parts by weight of a high molecular weight rubbery polymer composed of a major portion of isobutylene and a minor portion of a multiolefin and (b) about 1 to 100 parts by weight of para-hydrocarbon substituted phenol-aldehyde resin substantially free of methylol groups which contain 2 to 6 phenyl groups and an ester of $C_4$ to $C_5$ polyhydric alcohol and an acid selected from the group consisting of polymerized wood rosin and cyclic anhydride modified wood rosin, said resin and said ester being in a weight ratio of 0.3:1 to 15:1.

3. Composition of matter having improved adhesive properties which comprises an admixture of (a) 100 parts by weight of rubbery copolymer of isobutylene and $C_4$ to $C_8$ conjugated diolefin having a viscosity average molecular weight of at least 50,000 and (b) 1 to 60 parts by weight of para- $C_3$ to $C_{20}$ alkyl-phenol-formaldehyde resin substantially free of methylol groups which contains 3 to 5 phenyl groups and an ester of a $C_4$ to $C_5$ polyhydric alcohol and dimer to trimer of diterpene acid, said resin and said ester being in a weight ratio of 1.5:1 to 8:1.

4. Composition of matter according to claim 3 in which the resin is a non-reactive p-octyl phenol-formaldehyde resin and the ester is pentaerythritol ester of dimerized abietic acid.

5. Composition of matter according to claim 3 in which the copolymer is composed of at least 0.5 wt. percent combined halogen.

6. A vulcanizate comprising a major proportion of vulcanizable rubbery copolymer of a major portion of a $C_4$ to $C_7$ isoolefin and a minor portion of a $C_4$ to $C_8$ multiolefin and minor proportions of (a) curing agent, (b) para-hydrocarbon substituted phenol-aldehyde resin substantially free of methylol groups and (c) ester of a $C_4$ to $C_5$ polyhydric alcohol and wood rosin.

7. A vulcanizate comprising a major proportion of vulcanizable rubbery copolymer of a major portion of a $C_4$ to $C_7$ isoolefin and a minor portion of a $C_4$ to $C_8$ multiolefin and minor proportions of (a) sulfur-containing curing agent, (b) para-alkyl substituted phenol-formaldehyde resin substantially free of methylol groups which contains 2 to 6 phenyl groups and (c) ester of polyhydric $C_4$ to $C_5$ alcohol and an acid selected from the group consisting of $C_4$ to $C_5$ dibasic acid cyclic anhydride modified polymerized wood rosin.

8. Process for improving the adhesiveness of high molecular weight rubbery copolymer of a major portion of isobutylene and a minor portion of conjugated diolefin comprising mixing a major proportion of said polymer with minor proportions of (a) para- $C_3$ to $C_{20}$ hydrocarbon substituted phenol-formaldehyde resin substantially free of methylol groups which contains 2 to 6 phenyl groups and (b) ester of $C_4$ to $C_5$ polyhydric alcohol of an acid selected from the group consisting of polymerized wood rosin and cyclic anhydride modified wood rosin, said ester having a high softening point.

9. Process for improving the adhesiveness of high molecular weight rubbery copolymer composed of 85 to 99.5 wt. percent isobutylene and 0.5 to 15 wt. percent of $C_4$ to $C_8$ conjugated diolefin comprising mixing 100 parts by weight of said copolymer with about 1 to 90 parts by weight of (a) para- $C_3$ to $C_{20}$ alkyl phenol-formaldehyde resin substantially free of methylol groups which contains 3 to 5 phenyl groups and (b) an ester of $C_5$ tetrahydric alcohol and dimer to trimer of heterannular diene diterpene acid, said resin and said ester being in a weight ratio of 0.3:1 to 15:1.

10. Process according to claim 9 in which the resin is a non-reactive p-octyl phenol-formaldehyde resin and the ester is pentaerythritol ester of dimerized abietic acid.

References Cited in the file of this patent

UNITED STATES PATENTS

| | | |
|---|---|---|
| 2,530,099 | Van Buskirk et al. | Nov. 14, 1950 |
| 2,537,766 | Kirkland et al. | Jan. 9, 1951 |
| 2,656,297 | Davis et al. | Oct. 20, 1953 |
| 2,664,378 | Heller | Dec. 29, 1953 |
| 2,708,192 | Joesting et al. | May 10, 1955 |